Figure 4:
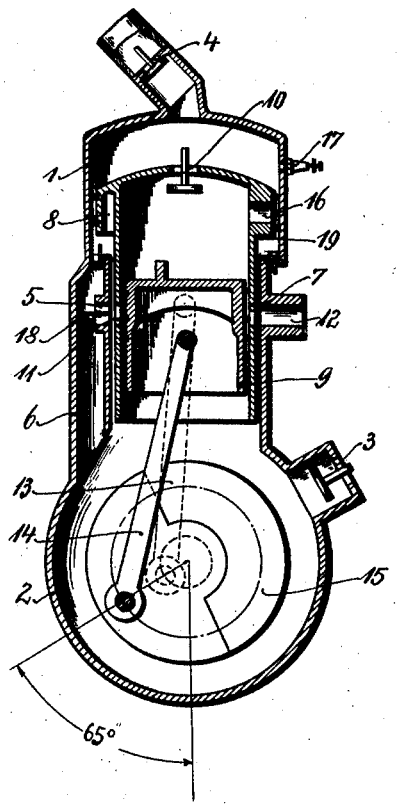

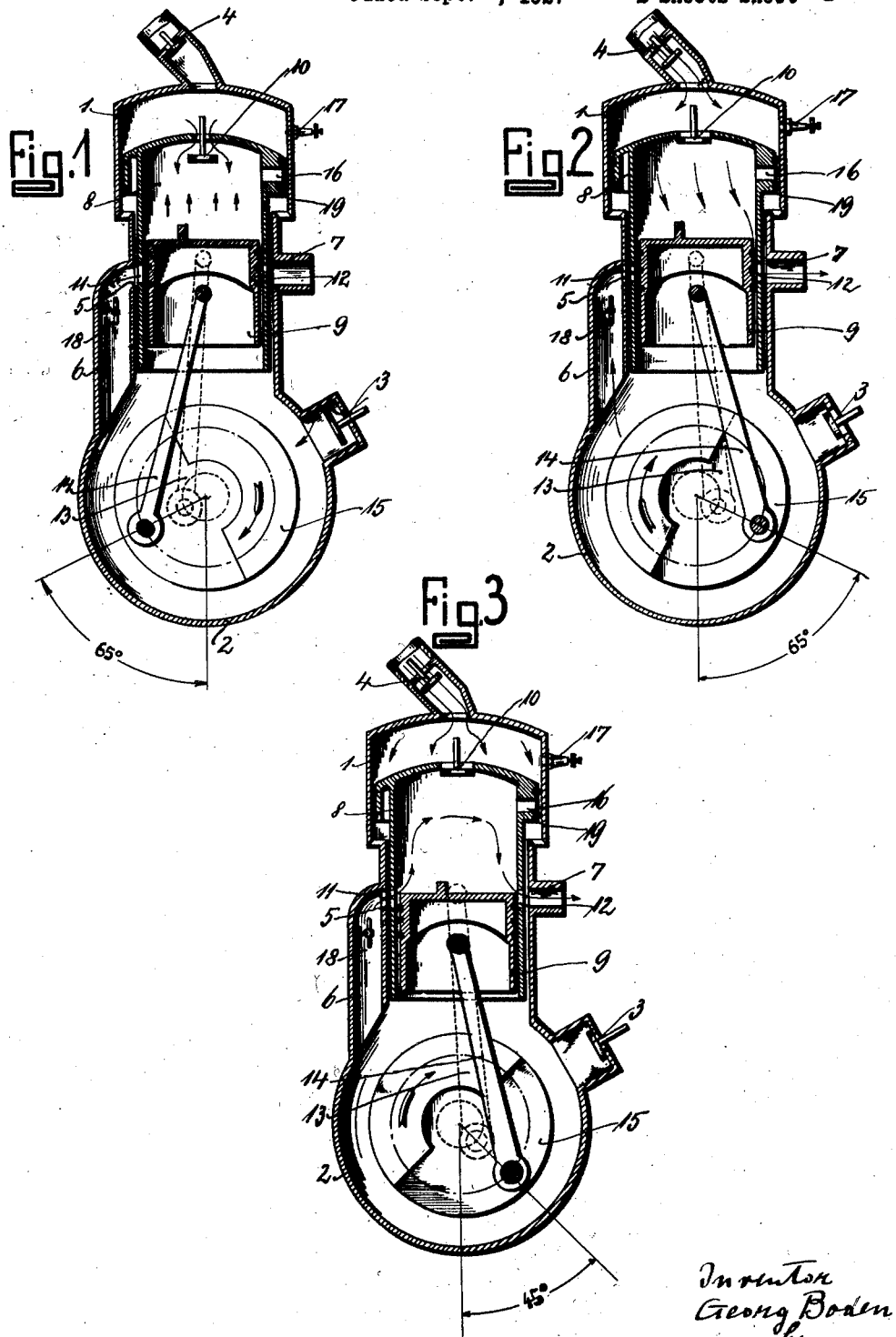

July 2, 1929.　　　　　G. BODEN　　　　　1,719,165

INTERNAL COMBUSTION ENGINE

Filed Sept. 8, 1927　　2 Sheets-Sheet 2

Inventor
Georg Boden
by
S. Pokal
Attorney.

Patented July 2, 1929.

1,719,165

UNITED STATES PATENT OFFICE.

GEORG BODEN, OF LEIPZIG-GOHLIS, GERMANY.

INTERNAL-COMBUSTION ENGINE.

Application filed September 8, 1927, Serial No. 218,348, and in Germany September 18, 1926.

The invention relates to internal combustion engines, more particularly to two stroke cycle engines.

In order to increase the power of an engine for sport and racing purposes, it is usual to alter it so that a higher compression pressure is obtained. This is effected either by removing an intermediate packing arranged between the cylinder and the cylinder head and thereby diminishing the compression space or by the addition of a compressor which forces air and fuel mixture into the cylinder in larger quantities than is possible by suction. It has been the endeavor of constructors to construct an engine which can be converted whilst running from an ordinary engine into a compressor engine and vice-versa without considerable alteration. The conversion of an ordinary engine into a compressor engine is desirable in order for the purpose of negotiating obstacles or difficulties, for instance, hills to increase the power of the engine temporarily.

The subject of the present invention is an internal combustion engine which fulfils this requirement.

The principal object of the invention is to provide an internal combustion engine in which the combustion cylinder is slidably mounted in a fixed cylinder and is moved in this latter by the crank shaft in the same direction as the working piston, but has only one third of the stroke of the said piston, the movable cylinder in conjunction with the fixed cylinder serving as a pump for the fuel supply which enters the movable cylinder through a valve provided in the cover of the latter, the arrangement being such that the piston on its upward movement sucks fresh air into the crank case which is attached to the fixed cylinder, which fresh air on the downward movement of the piston passes out of the crank case through a conduit provided with a throttle into the movable cylinder, drives the burnt gases out of the latter and completely fills it with fresh air. The dimensions of the charging pump can without difficulty be so chosen that it feeds the cylinder with more than 100% charge, inasmuch as the cylinder contains in adition a full charge of fresh air, whereby a compression effect is obtained. By cutting off the fresh air supply conduit the compressor engine as above constituted is converted into an ordinary engine.

A further object of the invention is to provide an engine which has the advantage, that the pressure at right angles to the sliding surfaces, which in ordinary engines acts against the torque of the engine, is eliminated.

Figure 5:
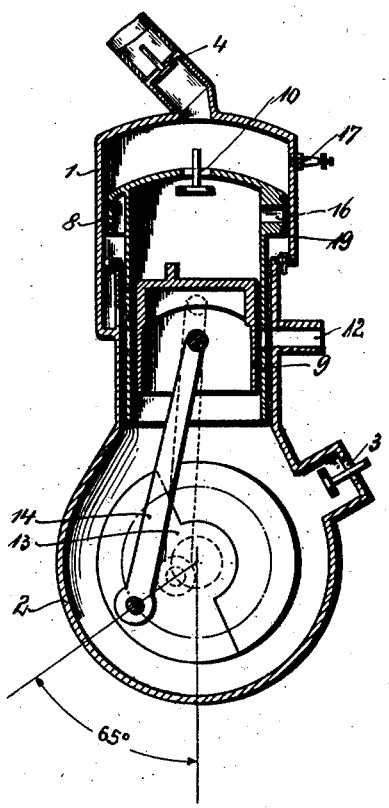

A preferred constructional form of a two stroke cycle engine according to the invention is illustrated by way of example in the accompanying drawings and the effect of the reactions at right angles to the sliding surfaces in the known two stroke cycle engines and also in the two stroke cycle engine according to the invention are likewise diagrammatically illustrated in the said drawings, in which:

Figs. 1 to 3 show a two stroke cycle engine according to the invention with the piston in various positions, Figs. 4 and 5 show two other constructional forms.

The numeral 1 designates a fixed stepped cylinder having the crank case 2 arranged on its lower part. A valve 3 is provided in an opening in the crank case 2 and a valve 4 is provided in a hood on the cylinder head. A conduit 6 leads from the crank case 2 to a port 5 arranged approximately in the middle of the narrow part of the stepped cylinder. Opposite to the port 5 an opening 7 having an external pipe connection is provided.

In the stepped cylinder 1 a stepped cylinder piston 8 open on one side is guided and in this latter a working piston 9, which may be plain or may have a deflecting plate, is guided. At the end of the stepped piston 8 a valve 10 is arranged and on the smooth cylindrical wall which forms the explosion space two ports 11, 12 arranged opposite to one another approximately in the middle are provided which correspond with the ports 5 and 7 of the cylinder 1. The connecting rods 13, 14 of the pistons 8, 9 are linked to the crank disc 15 in such manner that their crank pins lie in the same radial plane or slightly displaced with regard to one another, but the piston 8 has only about one third of the stroke of the piston 9. The two connecting rods 14 of the piston 8 engage, in a manner which is already known in prior constructional forms of engines, with pins arranged on the outer side of the said piston and extending through slots in the cylinder 1. These two connecting rods are arranged laterally outside of the closed crank case but are adapted to be easily accessible and are provided with covers.

The mode of operation is as follows:—

Assuming that the two pistons 8, 9 are in the highest position, then on the downward movement of the piston a supply of combustible mixture will be sucked in above the stepped piston through the valve 4. In consequence of the differing strokes of the two pistons these latter become displaced relatively to one another during the rotation of the crank disc 15, but they move always, or at least for the most part, in the same direction. On the downward movement of the two pistons the port 11 of the piston 8 comes into a position in which it registers with the port 5 of the air supply conduit 6. As soon as the piston 9 during its movement relatively to the piston 8 opens the port 11 of the said piston 8 fresh air passes from the crank case 2 through the conduit 6, which latter, if desired, may be constructed as a receiver and cooler, into the space in the piston 8 above the piston 9, which space the said air scavenges and fills, there being, when the cranks are slightly displaced with regard to one another, an extended period of time of closure of the ports. On the further upward movement of the two pistons, the piston 9 first closes the ports 11, 12 whilst the piston 8 compresses the combustible mixture present in the cylinder 1 during the upward movement and forces the said combustible mixture into the interior of the said piston 8 through the valve 10 under high pressure so that the said mixture superposes itself upon the air inside the piston 8 and becomes homogeneously mixed with said air. When the piston 8 has a small advance with regard to the piston 9, then the valve 10 is positively controlled in the open and closed periods, inasmuch as, after the upper dead centre has been passed and meanwhile the piston 9 is still moving slowly upwards, the pressure in the interior of the piston 8 rapidly increases, whilst on the other hand a partial vacuum arises in the fixed cylinder 1, as a consequence of which two effects the valve 10 must close, even if the speed of revolution is very high. At this point in the operation, a port 16 provided in the upper part of the piston 8, comes into register in front of the sparking plug 17, which is mounted in the upper part of the cylinder 1 and immediately pre-ignites the highly compressed fuel mixture present in the piston 8. The resultant explosion causes the piston 9 to be driven downwards. In consequence of the fact that the piston 9 is actuated from a longer crank arm, the power transmitted by the said piston 9 to the crank disc 15 is considerably greater than the oppositely operating power of the piston 8, which latter is also moved downward during the rotation of the crank shaft whilst the piston 9 is moving downwards. During the downward movement the port 12 of the piston 8 comes into position over the exhaust port 7 so that after the piston 9 has opened the port 12 the burnt gases are enabled to escape. Shortly after the opening of the exhaust, the port 11 in the piston 8 comes over the opening 5 of the fresh air conduit 6 and is opened through the medium of the piston 9 so that the air compressed in the crank case 2 on the downward movement of the piston 9 passes under pressure into the combustion space, drives out the remains of the burnt gases from this latter and fills it with fresh air. During the downward movement of the two pistons saturated air and fuel mixture has been sucked into the cylinder space above the piston 8 through the valve 4. The cycle of operations then repeats itself. During the upward movement of the two pistons fresh air passes through the valve 3 into the crank case 2.

In the fresh air admission conduit 6 a throttle device 18 is provided by means of which the conduit 6 may be closed off. If the conduit 6 is closed off then the supply fuel passes during the upward movement of the two pistons through the valve 10 directly into the combustion space of the piston 8 and is therein compressed by means of the piston 9. When the two pistons during the downward movement have opened the exhaust the burnt gases escape under great pressure so that a vacuum is caused to arise in the combustion space of the piston 8, which vacuum extends a considerable distance into the exhaust pipe 12, so that part of the supply fuel which has been sucked during the downward movement of the pistons into the cylinder space above the piston 8 at once flows through the valve 10 into the combustion chamber and thus drives out the remainder of the burnt gases. In this case the internal combustion engine operates in the ordinary way whilst in the first mentioned case it operates as a compressor engine. The throttle device 18 can be directly operated from the driver's seat, so that the engine may be employed whilst running, either as an ordinary engine, or as a compressor engine, as desired, without constructional modifications. In both modes of operation of the engine, atmospheric air is sucked into and forced out of the stepped part 19 of the fixed cylinder 1 by the piston in its movement up and down through air holes provided in the said stepped part 19, said air serving especially to scavenge and cool the combustion space of the piston 8. The richness of the mixture (fuel content) requisite for the one or the other mode of operation is regulated by adjustment of the air supply and of the carburetter. In view of the fact that, when the engine is employed as a compressor engine, the pressure is higher, it is necessary in certain cases to ensure that self-ignition of the fuel mixture does not occur. This possibility can be avoided by the use of spirituous fuels or of benzine admixed with other substances.

The two stroke engine proper is constituted, as will at once be obvious from the preceding description, by the piston 8 with the piston 9 running in it, whilst the piston 8 in conjunction with the cylinder 1 constitutes the pump for the gas supply and the cooling. The engine described can consequently be looked upon as a two stroke cycle engine having a cylinder which is moved with the piston. It has been proved, that in ordinary engines the non-cooled moving working piston does not become even approximately as hot as the fixed cylinder which is adequately cooled. In order to obtain efficient cooling of the cylinder, it has already been suggested that it would be desirable to move the cylinder as well as the piston. The engine according to the present invention thus provides a solution of this problem.

A substantial advantage attained by the engine according to the present invention results from the fact that, owing to its enormous capacity for taking an overcharge in regard to its cylinder content, it would appear to be particularly suitable for use with oil. Inasmuch as the engine, as an explosion engine, is specially arranged for high compression and as, when working in this way, with a compression ratio of 7, explosion pressures of 35 atmospheres and more may easily be obtained, an engine of this kind could also readily be employed as a constant pressure engine, if the sparking plug were replaced by a spraying device, in which case the piston 8 would also operate in conjunction with the cylinder 1 as an air pump.

The engine according to the present invention is, moreover, superior to the ordinary two stroke cycle engines in other respects, as can be seen from the following brief comparison:

Engines of the type in question intended for motor vehicles and having a crank case pump, gas scavenging, and ports controlled by the working piston, have in general an opening and closing angle of:—45° for the suction port, 65° for the exhaust port, and 45° for the connecting port. If now, for example, the cylinder content is 200 cubic centimetres and the delivery efficiency of the pump actually amounted to 100%, then the suction loss would amount to about 30 cubic centimetres and the compression loss to about 56 cubic centimetres. As, now, the very considerable vacuum which arises shortly after the exhaust draws out substantial quantities of unused supply fuel, only about 115–120 cubic centimetres volume becomes compressed, the thermic efficiency of which is, moreover, diminished by the residual gases in the cylinder.

In the case of an engine according to the invention, if the cylinder content is likewise 200 cubic centimetres and if the volume of the fuel supply pump—which may be altered at will by broadening the stepped part—only amounts to the same figure, then in the first place about 150 cubic centimetres of pure air will be retained in the interior of the cylinder by the upwardly moving working piston. Thereupon about 190 cubic centimetres of supply fuel will be forced under pressure into this volume of air, so that about 340 cubic centimetres of mixture will be fired. If about one-third of the charge is deducted for the actuation of the oppositely operating combustion cylinder, a charge of 230 cubic centimetres remains available for useful work, as against 120 cubic centimetres in the case of an ordinary two stroke cycle engine having the same cylinder content. In this calculation the fact has not been taken into account that the average working pressure is increased by the high compression and that the composition of the mixture is rendered much better thermically by the efficient air scavenging. Even when the engine is running in the ordinary way (i. e. not as a compressor engine) its output is greater than in the case of the ordinary engines. If the connecting conduit is closed, then the cylinder only becomes charged from the top with about 200 cubic centimetres. After the withdrawal of a third of the charge, as before, 135 cubic centimetres still remain available for useful work, whilst the composition of the said 135 cubic centimetres is better thermically than is the case in the ordinary known engines, inasmuch as the scavenging is effected from above downwards, so that a more perfect result is obtained. Loss of fuel is impossible in the engine according to the invention, either when it is running as an ordinary engine or as a compressor engine, inasmuch as in the latter case the upwardly moving working piston already closes the exhaust port when the valve 10 in the piston 8 opens. When running as an ordinary engine the vacuum which arises serves to open the valve 10 and the supply fuel enters the cylinder without pressure.

In certain circumstances the stepped part of the external cylinder 8 may also be employed as an air pump, which either operates, as shown in Fig. 4, in common with the crank case pump or, as shown in Fig. 5 replaces this latter.

I claim:—

1. In a two stroke cycle internal combustion engine adapted to work either as a normal two stroke cycle engine or as a two stroke cycle compressor engine, as required, the combination of: a stationary cylinder having a crank case attached to it; a movable cylinder slidably mounted within said stationary cylinder and driven from the crank shaft of the engine; a working piston slidably mounted within said movable cylinder and likewise driven from the crank shaft of the engine in such manner that it moves in the same direction with regard to the stationary cylinder as that in which said movable cylinder moves, but with a stroke about three times as long as that of the latter; a fuel supply admission valve in the end of said movable cylinder; an exhaust port arranged in the lower part of said movable cylinder; an exhaust port in said stationary cylinder co-operating with said first named exhaust port; an air inlet arranged in the lower part of said movable cylinder opposite to said first-named exhaust port; an air inlet in said stationary cylinder co-operating with said first named air inlet; said movable cylinder being adapted to operate in conjunction with said fixed cylinder as a pump for the admission of fuel through said valve into said movable cylinder, and said piston being adapted to suck a supply of air into said crank case on the upward movement of said piston, which supply of air passes on the downward movement of said piston through a conduit into the movable cylinder, drives the burnt gases out of the latter and completely fills it with air under pressure; and a throttle valve adapted when fully closed to shut off completely the supply of said air under pressure so as to enable the engine to run as a normal two stroke cycle engine.

2. In a two stroke cycle internal combustion engine adapted to work either as a normal two stroke cycle engine or as a two stroke cycle compressor engine as required, the combination of: a stationary stepped cylinder having a crank case attached to it; a movable stepped cylinder slidably mounted within said stationary cylinder and driven from the crank shaft of the engine; a working piston slidably mounted within said movable cylinder and likewise driven from the crank shaft of the engine in such manner that it moves in the same direction with regard to the stationary cylinder as that in which said movable cylinder moves, but with a stroke about three times as long as that of the latter; a fuel supply admission valve in the end of said movable cylinder; an exhaust port arranged in the lower part of said movable cylinder; an exhaust port in said stationary cylinder co-operating with said first named exhaust port; an air inlet arranged in the lower part of said movable cylinder opposite to said first-named exhaust port; an air inlet in said stationary cylinder co-operating with said first named air inlet; said movable cylinder being adapted to operate in conjunction with said fixed cylinder as a pump for the admission of fuel through said valve into said movable cylinder, and said piston being adapted to suck a supply of air into said crank case on the upward movement of said piston, which supply of air passes on the downward movement of said piston through a conduit into the movable cylinder, drives the burnt gases out of the latter and completely fills it with air under pressure; and a throttle valve adapted when fully closed to shut off completely the supply of said air under pressure so as to enable the engine to run as a normal two stroke cycle engine.

3. In a two stroke cycle internal combustion engine adapted to work either as a normal two stroke cycle engine or as a two stroke compressor engine, as required, a combination as specified in claim 2, in which the stepped part of the stationary cylinder is provided with air ports and the broader parts of the stepped stationary and movable cylinders are employed as an air pump, the air pumped by the stepped parts of the said cylinders being employed together with the fresh air from the crank case pump.

In testimony whereof I have hereunto set my hand.

GEORG BODEN.